United States Patent
Fujisawa

(10) Patent No.: US 10,025,222 B2
(45) Date of Patent: Jul. 17, 2018

(54) ROLLER AND IMAGE FORMING APPARATUS USING SAME

(71) Applicant: BRIDGESTONE CORPORATION, Tokyo (JP)

(72) Inventor: Yusuke Fujisawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/508,646

(22) PCT Filed: Aug. 28, 2015

(86) PCT No.: PCT/JP2015/074368
§ 371 (c)(1),
(2) Date: Mar. 3, 2017

(87) PCT Pub. No.: WO2016/035692
PCT Pub. Date: Mar. 10, 2016

(65) Prior Publication Data
US 2017/0285513 A1    Oct. 5, 2017

(30) Foreign Application Priority Data
Sep. 4, 2014   (JP) .................................. 2014-179988

(51) Int. Cl.
*G03G 15/08* (2006.01)

(52) U.S. Cl.
CPC ................................ *G03G 15/0808* (2013.01)

(58) Field of Classification Search
None
See application file for complete search history.

(56) References Cited

U.S. PATENT DOCUMENTS 6,142,922 A    11/2000   Yoshikawa et al.
6,283,903 B1    9/2001   Onuki et al.
(Continued)

FOREIGN PATENT DOCUMENTS

CN    1243523 A    2/2000
CN    1512084 A    7/2004
(Continued)

OTHER PUBLICATIONS

Communication dated Aug. 11, 2017 from the European Patent Office in counterpart Application No. 15837796.0.
(Continued)

*Primary Examiner* — Clayton E Laballe
*Assistant Examiner* — Jas Sanghera
(74) *Attorney, Agent, or Firm* — Sughrue Mion, PLLC

(57) ABSTRACT

Provided is a roller, in particular a conductive roller, capable of suppressing generation of cut debris from a cut surface of an end part of a foam layer in the roller axial direction over a long period of time, and an image forming device using the roller. A roller includes a shaft 1, a foam layer 2 and at least one film layer 3 sequentially provided on the outer periphery of the shaft. Both end parts in the roller axial direction of the foam layer and the film layer are cut, a filler layer 4 is provided on the cut surface of the cut foam layer and the cut film layer, at least the cut surface of the foam layer is covered with the filler layer, and the filler layer contains a water-based urethane resin.

6 Claims, 1 Drawing Sheet

(56) References Cited

U.S. PATENT DOCUMENTS

| | | | |
|---|---|---|---|
| 7,641,973 B2 | 1/2010 | Hattori et al. | |
| 8,105,222 B2* | 1/2012 | Lin | G03G 15/0818 399/286 |
| 2001/0003757 A1 | 6/2001 | Sakata et al. | |
| 2006/0039721 A1* | 2/2006 | Shiomura | G03G 15/0808 399/286 |
| 2009/0136268 A1 | 5/2009 | Lin | |
| 2010/0189473 A1* | 7/2010 | Sugimura | G03G 15/0818 399/286 |
| 2012/0322637 A1* | 12/2012 | Takano | C08J 9/0066 492/56 |
| 2016/0018751 A1 | 1/2016 | Imai et al. | |

FOREIGN PATENT DOCUMENTS

| | | |
|---|---|---|
| JP | 63-198062 U1 | 12/1988 |
| JP | 09-262912 A | 10/1997 |
| JP | 2003-084542 A | 3/2003 |
| JP | 2004-085695 A | 3/2004 |
| JP | 2005-121982 A | 5/2005 |
| JP | 2007-147857 A | 6/2007 |
| WO | 2014136829 A1 | 9/2014 |

OTHER PUBLICATIONS

Internal Search Report for PCT/JP2015/074368, dated Nov. 17, 2015.

Communication dated Apr. 19, 2018, from the State Intellectual Property Office of People's Republic of China in counterpart Application No. 201580047635.X.

* cited by examiner

ROLLER AND IMAGE FORMING APPARATUS USING SAME

CROSS REFERENCE TO RELATED APPLICATIONS

This is a National Stage of International Application No. PCT/JP2015/074368 filed Aug. 28, 2015, claiming priority based on Japanese Patent Application No. 2014-179988 filed Sep. 4, 2014, the contents of all of which are incorporated herein by reference in their entirety.

TECHNICAL FIELD

The present invention relates to a roller and an image formation device using the same (hereinafter, also simply referred to as a "device"), and in particular, to a conductive roller used in image formation devices such as copying machines, printers and in particular laser beam printers, and in particular to a roller suitable as a developing roller and an image formation device using the same.

BACKGROUND ART

In general, in image formation devices using electrophotographic printing methods such as copying machines, printers, facsimiles, etc., rollers provided with electrical conductivity are used such as transfer rollers, developing rollers, toner supply rollers, electrification rollers, cleaning rollers, intermediate transfer rollers, belt driving rollers, etc. in each step of the image formation.

As such a roller member, in order to obtain desired surface roughness, electrical conductivity and hardness etc., conventionally used is one that are provided with a layer or layers provided on the outer periphery of a basic structure which is a structure constituted by shaft on which an elastic layer is formed, the elastic layer being composed of rubber, polymeric elastomer, polymer foam, etc. which was given electrical conductivity by the combination of a conductive agent.

As a technology relating to the improvement of the conductive roller, for example, Patent document 1 describes a conductive roller having a core metal, a substrate provided on the surface thereof and a filler layer provided on the cylindrical surface of the substrate which is composed of conductive flexible polyurethane foam, wherein a release opening for a bubble of conductive flexible polyurethane foam in the cylindrical surface is blocked by the filler layer.

RELATED ART DOCUMENT

Patent Document

Patent Document 1: Japanese Unexamined Patent Publication No. H9-262912 (Claims etc.)

SUMMARY OF THE INVENTION

Problems to be Solved by the Invention

However, when the elastic layer supported on the outer periphery of the shaft is formed by a foam layer and the end of the shaft is cut in its axial direction in order to adjust the roller size and shape, cut waste is sometimes generated from the end of the foam layer exposed due to cutting. Such cut waste, if transferred to photo sensitizer or paper in an image formation device, is problematic due to the occurrence of an image defect. Although, for dealing with the problem, methods of air spraying and wipe spraying treatment may be used to remove cut debris, they cannot remove it completely.

On the other hand, although it is conceivable to suppress generation of cut debris by providing a filler layer on a cut surface of a roller end part subjected to a cut process, since a roller member is driven to rotate in an image forming device, it is important to secure durability associated with its use.

Accordingly, an object of the present invention is to provide a roller, in particular a conductive roller, capable of suppressing generation of cut debris from a cut surface of an end part of a foam layer in the roller axial direction over a long period of time, and an image forming device using the roller.

Means for Solving the Problems

The present inventor intensively studied to find that the above-described problems can be solved by providing a filler layer made of a specific material on a cut surface of an end part of a roller subjected to a cut process, thereby completing the present invention.

That is, a roller of the present invention is a roller comprising a shaft, a foam layer and at least one film layer sequentially provided on an outer periphery of the shaft, characterized in that both end parts in the roller axial direction of the foam layer and the film layer are cut, a filler layer is provided on the cut surface of the cut foam layer and the cut film layer, at least the cut surface of the foam layer is covered with the filler layer, and the filler layer contains a water-based urethane resin.

In the roller of the present invention, preferably, the water-based urethane resin is ester/ether-based or carbonate-based. In the roller of the present invention, preferably, the foam layer is composed of a polyurethane foam having a density of from 0.1 to 0.7 g/cm$^3$. Further, in the roller of the present invention, preferably, the filler layer contains a silicone-based additive, and suitably, a film thickness of the filler layer is from 10 to 100 μm. Still further, the roller of the present invention is suitably a conductive roller.

Further, the image forming device of the present invention is characterized in that the above-described roller of the present invention is mounted thereon.

Effects of the Invention

According to the present invention, by providing a filler layer containing a water-based urethane resin on cut surfaces of a foam layer and a film layer, it becomes possible to realize a roller capable of suppressing generation of cut debris from the cut surface of an end part of the roller axial direction of the foam layer and preventing generation of an image failure caused by cut debris over a long period of time, and an image forming device using the roller.

MODE FOR CARRYING OUT THE INVENTION

An embodiment of the present invention will now be described with reference to the drawings.

Figure 1:
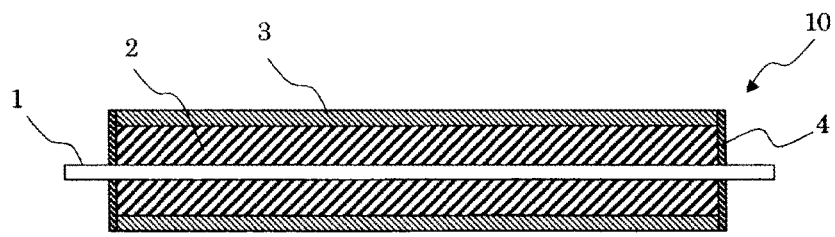
FIG. 1 is a longitudinal cross-sectional view illustrating one configuration example of a roller of the present invention.

FIG. 1 depicts a longitudinally cross-sectional view of an example of a roller of the present invention. As depicted, the roller 10 of the present invention is provided with a shaft 1, a foam layer 2 supported on the outer periphery of the shaft and at least one film layer covering the outer periphery of the foam layer which is a film layer 3 in the illustrated example.

In the roller of the present invention, both ends of the foam layer 2 and at least one film layer 3 in the roller axial direction are cut, and a filler layer 4 covering at least a cut surface of the foam layer 2 is provided on the cut surface of the cut foam layer 2 and at least one cut film layer 3. In the present invention, the filler layer 4 is characterized by being formed of a material containing a water-based urethane resin.

In the present invention, by providing a filler layer 4 covering at least the foam layer 2 on the cut surface to protect the cut surface and eliminate the exposure of the cut surface of the foam layer 2, it became possible to effectively suppress generation of cut debris from the cut surface. On the other hand, when a roller is attached to a cartridge and mounted on a device, the roller contacts and collides with another member, so that a filler layer deforms and peels off, which may lose an effect of suppressing cut debris. However, by using a water-based urethane resin as the filler layer, it becomes possible to improve the durability by enhancing the strength and abrasion resistance of the filler layer and the adhesion to the cut surface. In particular, as will be described later, when the foam layer 2 is formed of polyurethane foam, since the foam layer 2 and the filler layer 4 using the water-based urethane resin have the same functional group, compatibility is good and adhesiveness is more improved. This makes it possible to prevent an image failure caused by adhesion of cut debris to a photo sensitizer or the like in an image forming device over a long period of time.

The water-based urethane resin used for the filler layer 4 is a self-emulsifying type obtained by emulsifying a urethane resin, and may be of any type, such as an ether-based, an ester-based, an ester/ether-based, and a carbonate-based, and from the viewpoint of adhesiveness to a cut surface and durability, an ester/ether-based or a carbonate-based is preferably used. The reason why a water-based urethane resin is used is that in a solvent system, a water-based urethane resin penetrates into the foam layer 2 and swells the foam layer 2.

The filler layer 4 preferably contains a silicone-based additive. By adding a silicone-based additive to a water-based urethane resin, it is possible to reduce the coefficient of friction of the surface of the filler layer 4 to be formed, thereby further improving the durability. Specific examples of the silicone-based additive which can be used include acrylic-silicone graft polymer. The addition amount of the silicone-based additive is preferably from 5 to 30% by mass, and more preferably from 5 to 10% by mass in the total amount of the water-based urethane resin and the silicone-based additive in solid content. In particular, by containing the silicone-based additive in an amount of 5 to 10% by mass, it is possible to provide the filler layer 4 in a uniform coating state while sufficiently reducing the frictional force.

The filler layer 4 can be formed by applying a coating liquid prepared by adding a silicone-based additive to a water-based urethane resin, as needed, to the cut surface using a dispenser, a stamp, a spray, a knife coater, or the like, then volatilizing, and curing. Specific examples of the coating method include a method of scratching and painting the paint supplied to the cut surface with a dispenser or the like with a doctor knife or the like and a method of spray painting on the cut surface, and as a heating method, a general method may be appropriately used.

Since the filler layer 4 is acceptable so long as it can cover at least the cut surface of the foam layer 2, the filler layer 4 may be formed into the same diameter as that of the roller or a diameter larger than or equal to the outer diameter of the foam layer 2 and smaller than that of the roller. The filler layer 4 may be formed specifically, for example, into an outer diameter of [(outer diameter of the roller)–0 μm~ (outer diameter of the roller)–250 μm] although it depends on the roller size.

The thickness of the filler layer 4 may be any thickness as long as it can completely cover a cut surface of the foam layer 2, and is preferably from 10 to 100 μm. By setting the film thickness in this range, it is possible to accurately attach the roller to a mounting position when the roller is mounted on a cartridge, while securing the durability of the filler layer 4.

In the present invention, the only important point is that in a roller having a cut surface of a foam layer at the end of the roller in the axial direction thereof, at least the cut surface of the foam layer was covered by a filler layer, and otherwise the constitution may be made appropriately according to conventional methods and is not particularly limited.

For example, the shaft 1 is not limited so long as it is well electro-conductive, and any shafts can be used, which, for example, include steel metals such as sulfur free cutting steel plated with nickel, zinc or the like, solid core metals made from a metal such as iron, stainless steel, aluminum, etc., metal shafts such as a hollow metal cylindrical body etc., and shafts made from well electro-conductive plastics.

The foam layer 2 is composed of foam, and specifically can be formed from elastomer such as polyurethane, silicone rubber, ethylene-propylene-diene rubber (EPDM), acrylonitrile-butadiene rubber (NBR), natural rubber, styrene-butadiene rubber (SBR), butadiene rubber, isoprene rubber, polynorbornene rubber, butyl rubber, chloroprene rubber, acrylic rubber, epichlorohydrin rubber (ECO), ethylene-vinyl acetate copolymer (EVA) and the mixture thereof, and is suitably composed of polyurethane foam. According to the present invention, generation of a cut debris can be suppressed, and therefore, a roller using polyurethane foam excellent in image characteristics can be used without problems. The foam constituting the foam layer 2 is formed by foaming chemically the above-described elastomer with a foaming agent or by foaming it mechanically by involving air therein as in the case of polyurethane foam.

In addition, since compression permanent deformation performance is improved when the foam constituting the foam layer 2 is a closed-cell foam, bubbles in the foam are suitably closed-cell bubbles. In order for bubbles in the foam to be closed-cell, the procedure of foaming the above-mentioned elastomeric raw material by mechanical stirring of the foam is suitably adopted.

Raw polyurethane materials for forming the polyurethane foam which are suitably used for the foam layer 2 are not especially limited so long as they contain a urethane bond in the resin. As a polyisocyanate constituting the raw polyurethane material, aromatic isocyanate or the derivative thereof, aliphatic isocyanate or the derivative thereof, and alicyclic isocyanate or the derivative thereof are used. Aromatic isocyanate or the derivative thereof is preferable among them, and tolylenediisocyanate or the derivative thereof, and diphenylmethane diisocyanate or the derivative thereof are particularly suitably used. As tolylenediisocyanate or the derivative thereof, crude tolylenediisocyanate, 2,4-tolylenediisocyanate, 2,6-tolylenediisocyanate, the mixture of 2,4-tolylenediisocyanate and 2,6-tolylenediisocyanate, the urea modified products thereof, the biuret modified products thereof, the carbodiimide modified products thereof, and urethane product modified by polyol etc. are used. As diphenyl methane diisocyanate or the derivative thereof, for example, diphenylmethane diisocyanate or the derivative thereof, obtained by phosgenation of diaminodiphenylmethanes or the derivative thereof are used. The derivatives of diaminodiphenylmethane, include polynuclear products, and pure diphenylmethane diisocyanate obtained from diaminodiphenylmethane, polymeric diphenylmethane diisocyanates obtained from the polynuclear products of diaminodiphenylmethane can be used. As for the number of functional groups of polymeric diphenylmethane diisocyanate, a mixture of pure diphenylmethane diisocyanate and polymeric diphenyl methane diisocyanate having various numbers of functional groups is usually used, and a mixture having an averaged number of functional groups preferably from 2.05 to 4.00, more preferably from 2.50 to 3.50 are used. In addition, derivatives obtained by the modification of these diphenylmethane diisocyanates or derivatives thereof, for example, such as urethane modification products modified by polyol etc., dimers by uretdione formation, isocyanurate modification products, carbodiimide/uretonimine modification products, allophanate modification products, urea modification products, biuret modification products can be also used. Further, a blend of several kinds of diphenylmethane diisocyanates and the derivatives thereof can be also used.

Polyol components constituting raw polyurethane materials can be used which include polyether polyol from the addition polymerization of ethylene oxide with propylene oxide, polytetramethylene ether glycol, polyester polyol from the condensation of the acid component and the glycol component, polyester polyol from the ring-opening polymerization of caprolactone, and polycarbonate diol. Polyether polyol from the addition polymerization of ethylene oxide with propylene oxide include products from the addition polymerization of ethylene oxide with propylene oxide, for example, by using, as a starting material, water, propylene glycol, ethylene glycol, glycerin, trimethylolpropane, hexane triol, triethanolamine, diglycerine, pentaerythritol, ethylenediamine, methyl glucoside, aromatic diamine, sorbitol, sucrose, phosphoric acid, etc., and particularly suitable is a product from water, propylene glycol, ethylene glycol, glycerin, trimethylolpropane, hexane triol used as a starting material.

As for the ratio and microstructure of added ethylene oxide and propylene oxide, the ratio of ethylene oxide is preferably from 2 to 95% by mass, more preferably from 5 to 90% by mass. In particular, the polyether polyol having ethylene oxide added on the terminal thereof is preferably used. The arrangement of ethylene oxide and propylene oxide in the molecular chain is preferably random. The molecular weight of this polyether polyol, bifunctional when obtained from water, propylene glycol and ethylene glycol as starting materials, is preferably in the range from 300 to 6000 by weight-average molecular weight, particularly preferably from 400 to 3000. The molecular weight of the polyether polyol, trifunctional when obtained from glycerin, trimethylolpropane and hexane triol as starting materials, is preferably in the range from 900 to 9000 by weight-average molecular weight, and particularly preferably from 1500 to 6000. A blend of the bifunctional polyol and the trifunctional polyol can be appropriately used.

Polytetramethylene ether glycol is obtained, for example, from cationic polymerization of tetrahydrofuran, and the product having weight-average molecular weight in the range from 400 to 4000, particularly from 650 to 3000 is preferably used. It is also preferable to blend polytetramethylene ether glycols with different molecular weights. In addition, polytetramethylene ether glycols obtained from copolymerization of alkylene oxides such as ethylene oxide and propylene oxide can be also used. It is also preferable to use a blend of polytetramethylene ether glycol and polyether polyol from addition polymerization of ethylene oxide with propylene oxide, and in this case, it is preferably used so that the ratio of polytetramethylene ether glycol to polyether polyol from addition polymerization of ethylene oxide with propylene oxide is within the range from 95:5 to 20:80 by mass, and particularly from 90:10 to 50:50. Polymer polyol of acrylonitrile-modified polyol, polyol of melamine added to polyol, diols such as butane diol, polyols such as trimethylolpropane and the derivatives thereof can be used in combination with the above-mentioned polyol components.

Polyol may be prepolymerized by polyisocyanate in advance, and the methods include a method in which polyol and polyisocyanate are put into a suitable vessel, sufficiently stirred and kept at 30 to 90° C., more preferably 40 to 70° C., for 6 to 240 hours, more preferably for 24 to 72 hours. In this case, the ratio of the quantities of polyol and polyisocyanate are preferably adjusted so that the isocyanate content ratio of the prepolymer to be obtained is from 4 to 30% by mass, more preferably from 6 to 15% by mass. If the isocyanate content ratio is less than 4% by mass, the stability of the prepolymer is damaged, and the prepolymer may be hardened during storage and not be able to be provided for use. When the isocyanate content ratio exceeds 30% by mass, polyisocyanate content that has not been prepolymerized increases, and since this polyisocyanate is hardened with polyol component to be used in a later polyurethane hardening reaction, via a reaction mechanism similar to a one-shot process that does not undergo prepolymerization reaction, the advantage of the prepolymer method is diminished. As polyol components, when isocyanate component is used which is in prepolymer of polyol prepolymerized in advance by polyisocyanate, diols such as ethylene glycol and butane diol, polyols such as trimethylolpropane and sorbitol, and the derivatives thereof can be used in addition to the above-mentioned polyol components.

To the raw polyurethane material can be added a conductive agent such as an ionic conducting agent and an electro-conductive agent, a filler material such as carbon black and inorganic carbonate, an antioxidant such as phenol and phenylamine, a friction-reducing agent, and a charge adjustment agent, etc. Examples of the ionic conducting agent include ammonium salts such as perchlorate, chlorate, hydrochloride, bromate, iodate, fluoroborate, sulfate, ethylsulfonate, carboxylate, sulfonate of tetraethylammonium, tetrabutylammonium, dodecyltrimethylammonium (for example, lauryl trimethyl ammonium), hexadecyl trimethyl ammonium, octadecyl trimethyl ammonium (for example, stearyl trimethyl ammonium), benzyl trimethyl ammonium, modified fat dimethylethyl ammonium, etc., and perchlorate, chlorate, hydrochloride, bromate, iodate, fluoroborate, trifluoromethylsulfonate, sulfonate of alkali and alkaline earth metals such as lithium, sodium, potassium, calcium, magnesium. Examples of the electro-conductive agent include conductive carbons such as Ketjen black, acetylene black; carbons for rubber such as SAF, ISAF, HAF, FEF, GPF, SRF, FT, MT; oxidation-treated carbon for ink, thermal decomposition carbon, natural graphite, artificial graphite; electro-conductive metal oxides such as tin oxide, titanium oxide, zinc oxide; metals such as nickel, copper, silver, germanium. These conductive agents may be used alone or in a mixture of more than or equal to two of them. The blending amount thereof is not particularly limited and can be appropriately selected as desired, and the ratio is usually from 0.1 to 40 parts by mass, preferably from 0.3 to 20 parts by mass with respect to 100 parts by mass of the raw polyurethane material.

Catalysts used in the hardening reaction of the raw polyurethane materials include monoamines such as triethylamine and dimethyl cyclohexylamine, diamines such as tetramethylethylene diamine, tetramethyl propane diamine and tetramethyl hexane diamine, triamines such as pentamethyldiethylene triamine, pentamethyldipropylene triamine, tetra-methylguanidine, cyclic amines such as triethylenediamine, dimethyl piperazine, methylethyl piperazine, methyl morpholine, dimethylaminoethyl morpholine, dimethyl imidazole, alcoholic amines such as dimethylamino ethanol, dimethylaminoethoxy ethanol, trimethylaminoethylethanol amine, methylhydroxyethyl piperazine, hydroxyethyl morpholine, ether amines such as bis(dimethylaminoethyl)ether, ethylene glycol bis(dimethyl)amino propyl ether, and organometallic compounds such as stannous octoate, dibutyl tin diacetate, dibutyl tin dilaurate, dibutyl tin mercaptide, dibutyl tin thiocarboxylate, dibutyl tin dimaleate, dioctyl tin mercaptide, dioctyl tin thiocarboxylate, phenyl mercury propionate, lead octenoate. These catalysts can be used alone or in combination of two or more of them.

In the present invention, it is preferable that a silicone foam stabilizer and various surfactants are combined into the raw polyurethane materials for stabilizing the cells in the foam material. As the silicone foam stabilizer, dimethylpolysiloxane-polyoxyalkylene copolymer, or the like is suitably used, and particularly preferable is the copolymer having the dimethylpolysiloxane moiety of molecular weight from 350 to 15000 and the polyoxyalkylene moiety of molecular weight from 200 to 4000. As for the molecular structure of the polyoxyalkylene moiety, the addition polymer of ethylene oxide and the co-addition polymer of ethylene oxide and propylene oxide are preferable, and the molecular terminals of the polymers are also preferably ethylene oxide. The surfactants include ionic surfactants such as cationic surfactants, anionic surfactants and amphoteric surfactants, and non-ionic surfactants such as various polyethers and various polyesters. The blending amount of the silicone foam stabilizer and the various surfactants are preferably from 0.1 to 10 parts by mass, more preferably from 0.5 to 5 parts by mass to 100 parts by mass of the raw polyurethane material.

The polyurethane foam used in the present invention preferably has a density within the range from 0.1 to 0.7 g/cm$^3$, more preferably from 0.50 to 0.65 g/cm$^3$. In particular, when polyurethane foam is used which has a low density roughly within these ranges, cut waste is likely to occur, and the application of the present invention is effective. Too low and too high densities are both undesirable because the too low density leads to the coarsening of the bubble, and the too high density leads to the worsening of roller performance.

The ASKER C hardness of the polyurethane foam is preferably from 15 to 70°, more preferably from 15 to 45°. In the present invention, the mechanical floss method, the water foaming method, the foaming agent floss method, etc., which are conventionally used, can be used as a method of foaming in advance the raw polyurethane material, and the mechanical floss method, which performs foaming by mechanical stirring while mixing inactive gas, is preferably used regarding obtaining polyurethane foam of the closed-cell foam structure having a suitable density and hardness. Any inactive gasses used in the mechanical floss method are acceptable so long as they are inactive gas in polyurethane reaction, and include gasses non-reactive to the raw polyurethane materials such as nitrogen, carbon dioxide and dry air as well as inactive gasses in a narrow sense such as helium, argon, xenon, radon and krypton. By injecting the foamed raw polyurethane material into a metal mold, followed by the hardening thereof, polyurethane foam can be obtained which has self-skin layer (thin stratified film) formed on the part of the foam in contact to the metal mold. At that time, a method of coating with fluoro-resin etc. the inner surface of the metal mold can give mold-releasing property to the metal mold.

The molding conditions of the foam layer 2 is not particularly limited and can be obey usually conditions, and for example, the foam layer 2 can be obtained by starting the foaming of the raw polyurethane material at a temperature within the range from 15 to 80° C., preferably from 20 to 65° C., and completing injection into the metal mold in which shaft 1 is placed, and then performing cure at a temperature from about 70 to 120° C., followed by removal of the product from the mold.

In the present invention, at least one film layer is formed on the outer periphery of the foam layer 2. Although in an example depicted in FIG. 1 one film layer 3 as a surface layer forming a roller surface is provided on the outer periphery of the foam layer 2, two film layers of an intermediate layer and a surface layer can be also provided without limitation, and moreover, other functional layers may be added.

For example, the surface layer can be formed by solvent-based paints such as urethane-based, acrylic-based, acrylic urethane-based and fluorine-based ones, and the surface roughness of the layer can be adjusted by containing spherical microparticles made of urethane, acryl, silica, etc. The surface roughness of such a surface layer is usually less than or equal to 2 μm, particularly preferably within the range from 0.5 to 1.5 μm based on the JIS arithmetic average roughness Ra. Desired electrical conductivity can be given by appropriately containing the above-mentioned ionic conductive agent and the electron conductive agent as a conductive agent. Although the thickness of the surface layer is not particularly limited, it may be usually from 1 to 50 μm, particularly from about 1 to about 40 μm.

The intermediate layer may be a water-based paint containing a conductive agent, and any one or at least two types selected from the group consisting of rubber-based, urethane-based and acrylic-based paints can be suitably used as the water-based paint. Latex such as natural rubber (NR), chloroprene rubber (CR), nitrile rubber (NBR) and styrene-butadiene rubber (SBR) can be appropriately used as the rubber-based paint, ether-based, ester-based emulsions and dispersions as the urethane-based paint, and acryl, acrylic styrene emulsions etc. as the acrylic-based paint. The same conductive agents as those mentioned above with respect to the foam layer 2 can be used as conductive agents contained in the paints without particular limitation. In addition, vulcanizers, vulcanization enhancers, rubber antioxidants, and the like can be appropriately added to the intermediate layer as desired.

The thickness of the intermediate layer is usually within the range from 10 to 100 μm, particularly from 30 to 80 μm. When the thickness is less than 10 μm, the solvent shielding effect for the foam layer and the filler effect for preventing oozing of contaminant from the lower layer side become insufficient, resulting in solvent erosion that makes impossible to provide a desired surface roughness. On the other hand, when the thickness exceeds 100 μm, the intermediate layer cannot follow the softness of the foam layer 2, causing a crack and a peeling, the hardening of the roller itself, which could lead to a defect relating to the roller performance such as toner damage.

The intermediate layer can be formed into one or at least two layers by applying the above-mentioned water-based paint onto foam layer 2. Well-known procedures can be used as methods of coating the intermediate layer, which include, but are not limited to, dip coating, spray coating and roll-coater coating, and dip coating is suitably used. The micro hardness of the intermediate layer is suitably within the range from 10 to 45° for the film thickness of 500 μm, and the hardness roughly within this range can realize desired roller hardness for the finally obtained roller surface. The micro hardness can be measured, for example, by Micro Durometer Model MD-1.

The roller of the present invention is suitable as a conductive roller used in electrophotographic image forming devices etc. and can be suitably used specifically, for example, as various roller members such as developing rollers, electrification rollers, transfer rollers, toner supply rollers and cleaning rollers, and is particularly useful as a developing roller.

The roller of the present invention can be manufactured as follows: At first, a foam layer is formed on the outer periphery of a shaft by molding; Then, at least one film layer, specifically for example, the above-mentioned surface layer is directly formed, or an intermediate layer and the surface layer are sequentially formed by coating on the formed foam layer; Then, the formed foam layer and the film layer are cut at the both ends of the roller in the axial direction thereof, wherein cases of cutting the foam layer and the film layer at the both ends of the roller in the axial direction thereof include a case of cutting the end parts of the roller expanded by molding and a case of adjusting the size of the roller from the view point of the appearance of the roller; Then, by the above-mentioned techniques, the filler layer in a size enough to cover at least the foam layer is provided on the cut surfaces of the cut foam and film layers, and thus the roller of the present invention can be obtained.

Figure 2:
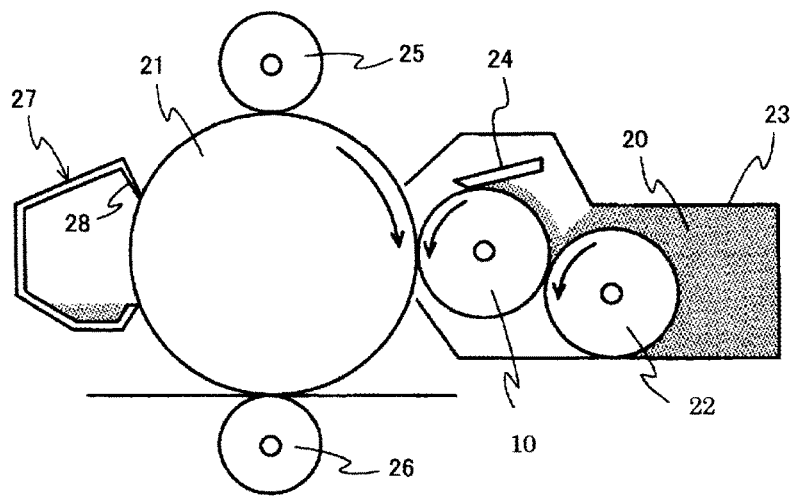
FIG. 2 is a partial cross-sectional view illustrating one configuration example of an image forming device of the present invention.

Further, the image forming device of the present invention is characterized in that the roller of the above present invention, especially the conductive roller, the developing roller among others is mounted thereon, thereby enabling to solve the problem of the occurrence of an image defect due to the attachment of cut waste onto photo sensitizer etc. FIG. 2 depicts a partial cross-sectional view of an example of the image forming device of the present invention. In the illustrated image forming device of the present invention, there are provided an image forming body 21, such as photo sensitizer, retaining an electrostatic latent image, a developing roller 10, in contact to the image forming body 21, for visualizing the electrostatic latent image by the adhesion of toner 20 supported on the surface of the roller thereto, and a toner supply roller 22 for supplying the toner 20 to the developing roller 10, and image formation is performed by a series of processes which convey the toner 20 from a toner container 23 via the toner supply roller 22 and the developing roller 10 to the image forming body 21.

In the illustrated image forming device, the image forming body 21 is electrified to a constant potential by an electrification roller 25, and then, an electrostatic latent image is formed on the image forming body 21 by an exposure device (not illustrated). Then, by the rotation of the toner supply roller 22, the developing roller 10 and the image forming body 21 in the direction of the arrow in the figure, the toner 20 on toner supply roller 22 is sent via the developing roller 10 to the image forming body 21. The toner 20 on the developing roller 10 is shaped into a uniform thin layer by a layering blade 24, and by the rotation of the developing roller 10 and the image forming body 21 in contact with each other, the toner 20 from developing roller 10 adheres to the electrostatic latent image in the image forming body 21, resulting in the visualization of the latent image. The toner 20 adhering to the latent image is transferred by the transfer roller 26 to recording medium such as paper, and the toner 20 remaining on the image forming body 21 after the transfer is removed by a cleaning blade 28 in a cleaning part 27. The image formation device of the present invention may be further provided with well-known compartments (not illustrated) used in conventional image forming devices.

EXAMPLES

The present invention will now be described in detail by using Examples. First of all, polyurethane foam was supported on the outer periphery of a shaft (ø6 mm, 260 mm in length, material type: sulfur free cutting steel) by the mechanical floss method. The density of this polyurethane foam was 0.60 g/cm$^3$. In particular, a raw polyurethane material composed of an isocyanate component (prepolymerized isocyanate TDI+polyether polyol) of 100 parts by mass and a polyol component (polyether polyol) of 20 parts by mass, carbon-black (acetylene black) of 2 parts by mass, an ionic conducting agent (sodium perchlorate) of 0.2 parts by mass was prepared, and this raw polyurethane material was mechanically stirred, mixed with dry air by mixier, and foamed. The polyurethane-foam material was injected into a metal cylindrical split mold which was provided with a hole provided at the end thereof for penetrating the shaft and a metal cap placed for supporting the shaft. Inside the mold, the shaft was placed, with adhesive applied onto the outer periphery thereof. Then, the mold with polyurethane-foam material injected therein was left in a hot wind oven adjusted to be at 110° C. for one hour to allow the polyurethane-foam material to harden. The hardened polyurethane foam was released from the mold and dip-coated with CR rubber latex paint combined with carbon black (Ketjen black) to form an intermediate layer of a film thickness of 60 μm on the outer periphery of the foam layer. Then, the foam was dip-coated with polyurethane solvent-based paint combined with spherical polyurethane particles of $D^{50}$=10 μm and carbon black (acetylene black) to form a surface layer of a film thickness of 15 μm.

The roller body of the roller obtained above was cut at both ends of the roller in the axial direction thereof so that the size of the roller body was ø11.5 mm and 240 mm in length. Then, on the cut surface of the roller body, each of the filler layers described in the following Table was formed to obtain the sample rollers of Examples. In the case of a liquid adhesive, the filler layers were formed within the cut surface of ø11.5 mm by a seal coating (a transfer method by a seal-shaped jig) followed by heating. In the case of a hot melt adhesive, a sheet-shaped one was cut into a ring shape having an outer diameter of 11.5 mm, and was attached and welded by a hot pressing method. Further, in the case of washers, those made of stainless steel and polypropylene having an outer diameter of 11.5 mm were mounted by pushing them into a cut surface of the roller body.

<Evaluation Method>

Each of the obtained sample rollers was incorporated in a commercially available laser beam printer (LBP 7200C, manufactured by Canon Inc.), and 100 sheets of printing durability test was carried out. The results were evaluated by visual observation of the printed images, and the presence or absence (○ when no failure was generated, x when a failure was generated) of an image failure due to cut debris generated from a cut surface, and the presence or absence of a failure such as peeling of an adhesive in a filler layer after a printing test was evaluated.

Figure 3:
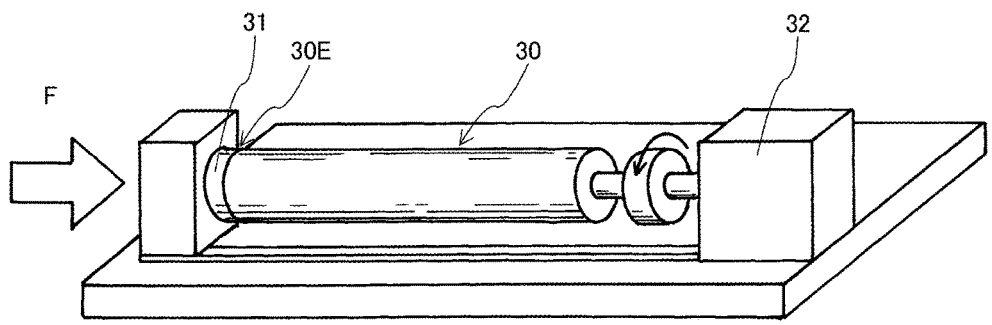
FIG. 3 is a schematic view illustrating a device used for durability evaluation in Examples.

Using the device illustrated in FIG. 3, the durability of cases in which a filler layer of each sample roller contacted and collided with another member in the device was evaluated. Specifically, with respect to an end part 30E of the roller body where a filler layer of each sample roller 30 was formed, a ring-shaped member 31 (inner diameter: 6 mm, outer diameter: 11.5 mm) made of polyacetal (POM) resin commonly used as a commercially available printer material was pressed with a load F of 1.5 N, and each sample roller 30 was rotated at 200 rpm to measure the time until scraping, peeling, and deformation of the filler layer occurred. Reference numeral 32 in the drawing indicates a motor. Evaluation criteria are as follows.

⊚: No scraping or the like occurred in 3 min.
○: Scraping or the like occurred in 3 min.
Δ: Scraping or the like occurred in 2 min.
x: Scraping or the like occurred in 1 min.

The results are listed on the following table.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Filler layer | Type | Liquid adhesive | Liquid adhesive | Liquid adhesive | Liquid adhesive | Liquid adhesive | Liquid adhesive | Liquid adhesive |
|  | Structure | Water-based urethane resin *1 | Water-based urethane resin *2 | Water-based urethane resin *3 | Synthetic rubber *4 | Acryl *5 | Vinyl acetate *6 | Epoxy *7 |
|  | Film thickness (μm) | 50 | 50 | 50 | 50 | 50 | 50 | 50 |
|  | Presence or absence of cut debris | ○ | ○ | ○ | ○ | ○ | ○ | ○ |
|  | Presence of absence of peeling of adhesive | None | None | None | None | None | None | None |
|  | Durability | ○ | ⊚ | ⊚ | Δ | Δ | Δ | Δ |

*1) UM700, manufactured by CEMEDINE Co., Ltd.
*2) Ester/ether-based urethane, SUPERFLEX 150 (solid content 30% by mass), manufactured by DKS Co. Ltd.
*3) Carbonate-based urethane (solid content 30% by mass, the breaking stress 48N/mm², breaking strain 340%, and tensile stress at 100% elongation 9.8N/mm² of a material of each filler layer, measured in accordance with a tensile test of JIS K 7127)
*4) 575, manufactured by CEMEDINE Co., Ltd.
*5) Y610, manufactured by CEMEDINE Co., Ltd.
*6) CH38, manufactured by Konishi Co. Ltd.
*7) EP007, manufactured by CEMEDINE Co., Ltd.

TABLE 2

|  |  | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Filler layer | Type | Liquid adhesive | Hot melt adhesive | Hot melt adhesive | Hot melt adhesive | Hot melt adhesive | Washer | Washer |
|  | Structure | Silicone *8 | Urethane-based *9 | Vinyl acetate-based *10 | Polyolefin-based *11 | Synthetic rubber *12 | Stainless | Polypropylene |
|  | Film thickness (μm) | 50 | 50 | 50 | 50 | 50 | 1000 | 200 |
|  | Presence or absence of cut debris | ○ | ○ | ○ | ○ | ○ | ○ | ○ |
|  | Presence of absence of peeling of adhesive | None | None | None | None | None | None | None |
|  | Durability | Δ | x | x | x | x | Δ | Δ |

*8) SILMATE82, manufactured by Toshiba Corporation
*9) ECELLENT, manufactured by Sheedom Co. Ltd.
*10) HM224, manufactured by CEMEDINE Co., Ltd.
*11) HM712, manufactured by CEMEDINE Co., Ltd.
*12) HHM650-2, manufactured by CEMEDINE Co., Ltd.

As listed on the above table, in any of the filler materials, it is possible to prevent occurrence of cut debris, there was no peeling of the filler layer after the printing test. From the viewpoint of durability, in each of the Examples in which a filler layer was formed using a liquid adhesive containing a water-based resin, there was no occurrence of scraping or the like in 2 min. In the Comparative Example using another type of liquid adhesive, scraping or the like occurred in 2 minutes. In the Comparative Example using a hot melt adhesive, scraping or the like occurred in 1 minute. In the Comparative Example using a washer, the washer got out around an axis in 2 minutes.

Next, using a water-based urethane resin (ester/ether urethane, SUPERFLEX 150, manufactured by DKS Co., Ltd.) and silicone-based additive (US450, manufactured by Toagosei Co., Ltd.) in a blending amount (based on solid content) listed on the following table, a filler layer was formed with a film thickness of 50 μm in the same manner as in the case of the above-described liquid adhesive to prepare a sample roller of each Example.

With respect to each of the obtained sample rollers, the coating state of the filler layer was visually observed, and the static friction coefficient of the surface of the filler layer was measured three times, and the average value thereof was determined.

Using the apparatus illustrated in FIG. 3, the durability in cases in which the filler layer of each sample roller contacted and collided with another member in a device was evaluated in the same manner as described above. Evaluation criteria are as follows. The results are listed in combination on the table below.

⊚⊚: No scraping or the like occurred in 4 min.
⊚: No scraping or the like occurred in 3 min. Scraping or the like occurred in 4 min.

Table below to form a filler layer in the same manner as in the case of the liquid adhesive, and a sample roller of each Example was manufactured.

Using the device illustrated in FIG. 3, the durability in cases in which the filler layer of each sample roller contacted and collided with another member in the device was evaluated in the same manner as described above. Evaluation criteria are as follows. The results are listed in combination on the table below.

⊚: No scraping or the like occurred in 3 min.
○: Scraping or the like occurred in 3 min.

TABLE 4

|  | Film thickness (μm) | Coating state | Durability |
| --- | --- | --- | --- |
| Example 8 | 10 | Good | ○ |
| Example 9 | 25 | Good | ⊚ |
| Example 2 | 50 | Good | ⊚ |
| Example 10 | 75 | Good | ⊚ |
| Example 11 | 100 | Good | ○ |

As listed on the above table, it was confirmed that a sufficient durability can be obtained while securing a favorable coating state even when the film thickness of the filler layer using the water based urethane resin was changed.

DESCRIPTION OF SYMBOLS 1 shaft
2 foam layer
3 film layer
4 filler layer
10 roller (developing roller)
20 toner

TABLE 3

|  | Material | % by mass | Material | % by mass | Coating state | Static coefficient of friction | Durability |
| --- | --- | --- | --- | --- | --- | --- | --- |
| Example 2 | Water-based urethane resin *2 | 100 | — | 0 | Good | 0.53 | ⊚ |
| Example 4 | Water-based urethane resin *2 | 95 | Silicone-based additive *13 | 5 | Good | 0.31 | ⊚ |
| Example 5 | Water-based urethane resin *2 | 90 | Silicone-based additive *13 | 10 | Good | 0.15 | ⊚⊚ |
| Example 6 | Water-based urethane resin *2 | 80 | Silicone-based additive *13 | 20 | Sea-island shape | 0.15 | ⊚⊚ |
| Example 7 | Water-based urethane resin *2 | 70 | Silicone-based additive *13 | 30 | Sea-island shape | 0.15 | ⊚⊚ |

*13) Acryl-silicone graft polymer, US450 (solid content 30% by mass), manufactured by Toagosei Co., Ltd.

As listed on the above table, it was confirmed that when a silicone-based additive was added to the water-based urethane resin in the filler layer, the friction coefficient was reduced, and the durability was improved accordingly. On the other hand, it was found that a urethane component and a silicone component were separated when the amount of the silicone-based additive was increased, and the coating state deteriorated.

Next, with the use of a water-based urethane resin (ester/ether-based urethane, SUPERFLEX 150, manufactured by DKS Co., Ltd.), the thickness was changed as listed on the 21 image forming body
22 toner supply roller
23 toner container
24 layering blade
25 electrification roller
26 transfer roller
27 cleaning part
28 cleaning blade
30 sample roller
30E end part of roller body
31 ring-shaped member
32 motor

The invention claimed is:

1. A roller comprising a shaft, a foam layer and at least one film layer sequentially provided on an outer periphery of the shaft, characterized in that both end parts in the roller axial direction of the foam layer and the film layer are cut, a filler layer is provided on the cut surface of the cut foam layer and the cut film layer, at least the cut surface of the foam layer is covered with the filler layer, and the filler layer contains a water-based urethane resin, wherein the filler layer contains acrylic-silicone graft polymer.

2. The roller according to claim 1, wherein the water-based urethane resin is ester/ether-based or carbonate-based.

3. The roller according to claim 1, wherein the foam layer is composed of a polyurethane foam having a density of from 0.1 to 0.7 $g/cm^3$.

4. The roller according to claim 1, wherein a film thickness of the filler layer is from 10 to 100 μm.

5. The roller according to claim 1 which is a conductive roller.

6. An image forming device is characterized in that the roller according to claim 1 is mounted thereon.

* * * * *